(12) United States Patent
Pina Coelho (10) Patent No.: US 10,133,647 B2
(45) Date of Patent: Nov. 20, 2018

(54) OPERATING A COMPUTER SYSTEM IN AN OPERATING SYSTEM TEST MODE IN WHICH AN INTERRUPT IS GENERATED IN RESPONSE TO A MEMORY PAGE BEING AVAILABLE IN PHYSICAL MEMORY BUT NOT PINNED IN VIRTUAL MEMORY

(71) Applicant: International Business Machines Corporation, Armonk, NY (US)

(72) Inventor: Jose Pina Coelho, Amadora (PT)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 14/929,826

(22) Filed: Nov. 2, 2015

(65) Prior Publication Data

US 2017/0123949 A1 May 4, 2017

(51) Int. Cl.
  *G06F 11/00* (2006.01)
  *G06F 11/22* (2006.01)
  *G06F 13/24* (2006.01)
  *G06F 11/36* (2006.01)
  *G06F 12/1009* (2016.01)

(52) U.S. Cl.
  CPC ...... *G06F 11/2289* (2013.01); *G06F 11/3648* (2013.01); *G06F 12/1009* (2013.01); *G06F 13/24* (2013.01); *G06F 2212/684* (2013.01)

(58) Field of Classification Search
  CPC combination set(s) only.
  See application file for complete search history.

(56) References Cited

U.S. PATENT DOCUMENTS

| | | | |
|---|---|---|---|
| 6,662,289 B1* | 12/2003 | Ang | G06F 12/1027 711/202 |
| 8,127,098 B1* | 2/2012 | Klaiber | G06F 9/45533 711/151 |
| 8,683,546 B2* | 3/2014 | Dunagan | G06F 21/577 726/1 |
| 8,842,126 B2 | 9/2014 | Kruger et al. | |
| 9,116,869 B2* | 8/2015 | Madukkarumukumana | G06F 13/24 |
| 9,436,495 B2* | 9/2016 | Tsirkin | G06F 9/45558 |
| 2004/0064672 A1* | 4/2004 | Fleming | G06F 12/1018 711/207 |
| 2004/0117588 A1* | 6/2004 | Arimilli | G06F 12/1063 711/203 |
| 2004/0221127 A1* | 11/2004 | Ang | G06F 12/1027 711/203 |
| 2007/0136554 A1* | 6/2007 | Biran | G06F 12/1081 711/203 |

(Continued)

*Primary Examiner* — Amine Riad
(74) *Attorney, Agent, or Firm* — Schmeiser, Olsen & Watts, LLP; Isaac Gooshaw (57) ABSTRACT

A method of operating a computer system in an operating system test mode. The computer system comprises a processor system, a physical memory system, and a secondary storage memory system. In response to a request to access a memory address, it is determined if the memory page associated with the memory address is available in the physical memory system, and if the memory page associated with the memory address is not pinned in the virtual memory area. In response to the memory page being available in the physical memory system but not pinned in the virtual memory area, an interrupt is generated.

3 Claims, 5 Drawing Sheets

(56) References Cited

U.S. PATENT DOCUMENTS

| | | | | |
|---|---|---|---|---|
| 2010/0332789 A1* | 12/2010 | Sugumar | ............ | G06F 12/1081 |
| | | | | 711/207 |
| 2011/0154111 A1* | 6/2011 | Beilmann | ............ | G06F 11/362 |
| | | | | 714/34 |
| 2012/0236010 A1* | 9/2012 | Ginzburg | ............... | G06F 12/08 |
| | | | | 345/502 |
| 2015/0067087 A1* | 3/2015 | Guerin | ............. | G06F 15/17331 |
| | | | | 709/212 |

* cited by examiner

OPERATING A COMPUTER SYSTEM IN AN OPERATING SYSTEM TEST MODE IN WHICH AN INTERRUPT IS GENERATED IN RESPONSE TO A MEMORY PAGE BEING AVAILABLE IN PHYSICAL MEMORY BUT NOT PINNED IN VIRTUAL MEMORY

TECHNICAL FIELD

The present invention relates to operating a computer system in an operating system test mode, and in particular during testing of operating system code.

BACKGROUND

It is common for computer systems to store data using virtual memory. Memory addresses in virtual memory are mapped to physical addresses in the computer system's memory, which may be physical memory (e.g. RAM), a hard disk, or any other suitable storage. Using virtual memory allows the operating system code to access stored data using a simple addressing structure. For example, data stored in memory can be moved between fast and slow memory storage (e.g. between RAM and hard disk), the virtual memory can appear to provide more memory than is actually available to the computer system, and any fragmentation of data in physical memory can be hidden from the operating system code.

Data is conventionally stored in virtual memory using pages, which are blocks of contiguous virtual memory addresses, usually of at least 4 kilobytes in size. Pages may be "pinned", which means that the data the pages contain are not moved out to the hard disk (or other secondary storage). Pages may be permanently pinned, pinned for a long period or for only a short period, depending on the requirement of the computer system and/or code. When a page is unpinned prematurely, an operating system failure may be triggered when a subsequent attempt is made to access the page.

In normal operation of a computer system, if external interrupts are disabled and the operating system cannot ask the controller to swap a required page into physical memory, or if the computer system cannot satisfy a request to swap a page into physical memory, the page remains unavailable and the operating system will perform a crash behaviour (for example calling a crash/dump handler). It may be desirable to test operating system code to identify such crashes. However, under test conditions it is often the case that not all unpinned pages are swapped out to disk, even though it is possible that under different operating conditions all unpinned pages could be swapped out to disk. Thus, a crash behaviour that could occur under normal operation due to a page fault may not be detected during testing.

SUMMARY

The present invention provides a method, and associated system and computer program product, for operating a computer system in an operating system test mode. The computer system comprises: a processor system comprising one or more processors; a physical memory system comprising one or more memories; and a secondary storage memory system comprising one or more computer readable hardware storage devices. The processor system uses the physical memory system and secondary storage memory to provide virtual memory. The method comprises, in response to a request to access a memory address in the virtual memory: the one or more processors determining if the a memory page associated with the memory address is available in the physical memory system; the one or more processors determining if the memory page associated with the memory address is not pinned in the virtual memory area; and in response to the memory page being available in the physical memory system but not pinned in the virtual memory area, said one or more processors generating an interrupt.

BRIEF DESCRIPTION OF THE DRAWINGS

Embodiments of the present invention will now be described, by way of example only, with reference to the following drawings.

DETAILED DESCRIPTION

In one embodiment of the present invention, there is provided a computer-implemented method of operating a computer system in an operating system test mode, the computer system comprising: a processor system; a physical memory system; and a secondary storage memory system, wherein the processor system uses the physical memory system and secondary storage memory to provide virtual memory, the method comprising, in response to a request to access a memory address in the virtual memory, the steps of: determining if the memory page associated with the memory address is available in the physical memory system; determining if the memory page associated with the memory address is not pinned in the virtual memory area; in the case that the memory page is available in the physical memory system but is not pinned in the virtual memory area, generating an interrupt.

In one embodiment, the computer system operating in test mode identifies circumstances under which page faults could occur that in normal operation would cause the operating system to perform crash behaviour, even though no page fault actually occurs.

The request to access the memory address may be a request to read from or write to the memory address. The request may be to read or write an instruction or data.

In one embodiment, the computer system comprises a flag indicating if the computer system is being operated in the test mode, wherein the interrupt is generated only if the flag is enabled, which allows the computer system to be run in normal mode or test mode.

In response to code attempting to access data from virtual memory, the computer system first checks if the page containing the data is available in the physical memory. If not, for example the page has been transferred to the hard disk (or other secondary storage), a page fault occurs. As discussed below, this will cause a page fault interrupt to be generated (i.e. a notification that a page fault has occurred), in which case the computer system will attempt to manage the page fault, for example by generating an external interrupt that is picked up by a controller that reads the page from the hard disk into the physical memory so that it is available for the code.

In one embodiment, the computer system comprises a flag indicating if paging is disabled, wherein the interrupt is generated only if the flag is enabled. The flag may indicate that external interrupts are disabled and/or are not serviceable. Alternatively, a register of the computer system may indicate an interrupt level register specifying the highest or lowest interrupt level that can be issued, in which case an external interrupt will be serviced only if the level of the external interrupt is compatible with the level indicated by the register.

Alternatively, it may be determined in any other suitable way that paging is not possible, and the interrupt generated only in that case.

The interrupt generated may be a conventional memory address fault interrupt. The interrupt may be a data storage interrupt (DSI) indicating that an attempt to store or read data from/to an address that has no corresponding real page mapped was made, or an instruction storage interrupt (ISI) indicating that an attempt to fetch an instruction from an address that has no corresponding real page mapped was made, for example. A flag associated with the generated interrupt may be enabled to indicate that the interrupt was generated in accordance with the operating system test mode. The flag may be provided in a status register of the computer system, for example.

Alternatively, the interrupt generated may indicate that the interrupt was generated in accordance with the operating system test mode. In other words, a new type of page fault interrupt may be provided specifically for use by the computer system when in the test mode.

In one embodiment, the method further comprises the step of, in response to the interrupt being generated, pinning the memory page in the virtual memory, which prevents a page fault from arising should an attempt to access the memory page be made at a subsequent time, which if it occurred could prevent further testing (as the operating system would perform crash behaviour). However, even though the pinning of the memory page means a subsequent page fault will not occur, the pinning of the memory page does not adversely affect the testing process as the interrupt generated at the time the page is pinned provides an indication that there is an issue that needs to be investigated.

In one embodiment of the present invention, there is provided a computer system comprising: a processor system; a physical memory system; and a secondary storage memory system, wherein the processor system is arranged to use the physical memory system and secondary storage memory to provide virtual memory, and wherein the computer system is arranged to operate in an operating system test mode in which, in response to a request to access a memory address in the virtual memory, an interrupt is generated if the memory page associated with the memory address is available in the physical memory system, but the memory page associated with the memory address is not pinned in the virtual memory area.

In one embodiment, the computer system comprises a flag indicating if the computer system is being operated in the test mode, and is arranged to generate the interrupt only if the flag is enabled.

In one embodiment, the computer system comprises a flag indicating if paging is disabled, and is arranged to generate the interrupt only if the flag is enabled.

The interrupt generated may be a conventional memory address fault interrupt. A flag associated with the generated interrupt may be enabled to indicate that the interrupt was generated in accordance with the operating system test mode.

Alternatively, the interrupt generated may indicate that the interrupt was generated in accordance with the operating system test mode.

In one embodiment, the computer system is further arranged in response to the interrupt being generated to pin the memory page in the virtual memory.

In one embodiment of the present invention, there is provided a computer program product for operating a computer system in an operating system test mode, the computer program product comprising a computer-readable storage medium having computer-readable program code embodied therewith, the computer-readable program code configured to perform any of the methods described above.

In one embodiment of the invention there is provided a computer program product for operating a computer system in an operating system test mode, the computer program product comprising a computer-readable storage medium having computer-readable program code embodied therewith, the computer-readable program code configured when executed on a computer system to provide any of the computer systems described above.

Figure 1:
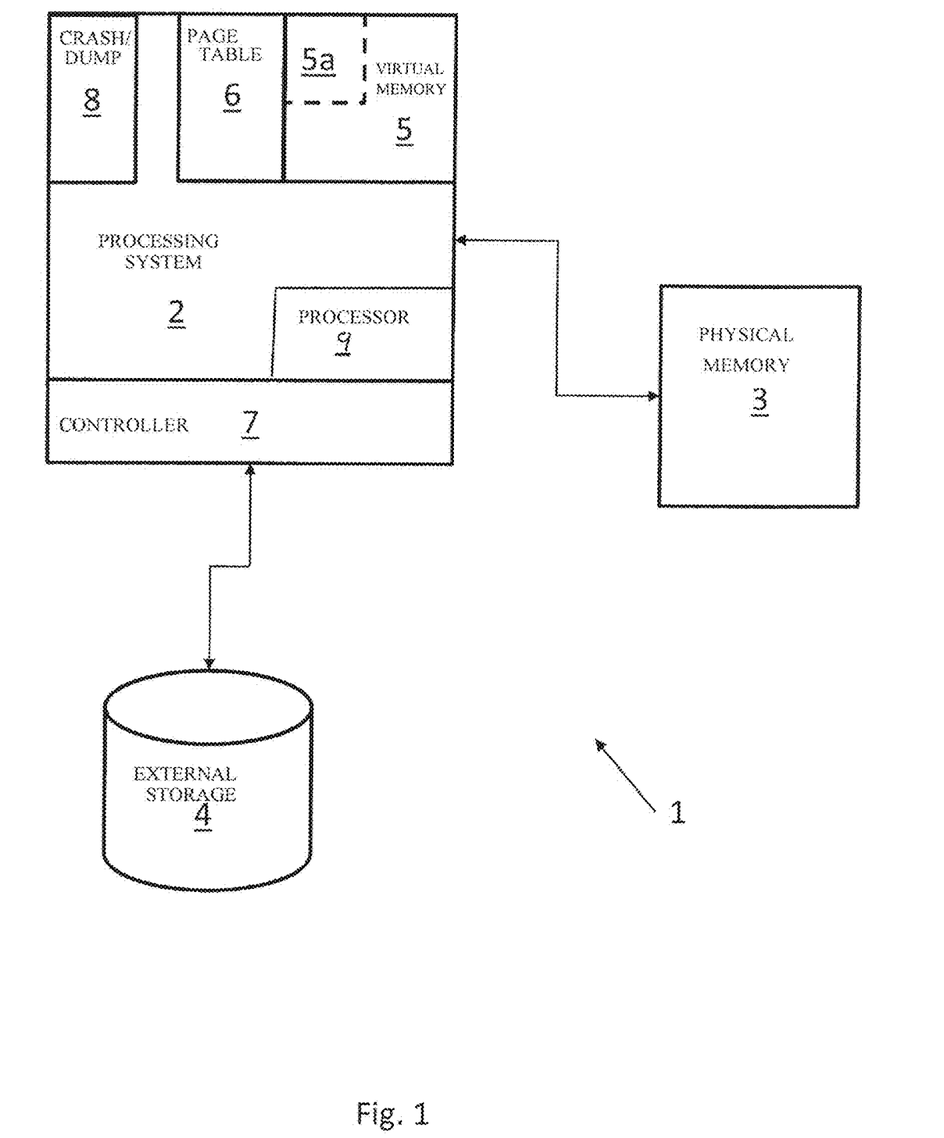
FIG. 1 is a schematic diagram of a computer system, in accordance with embodiments of the present invention.

FIG. 1 is a schematic diagram of a computer system 1, in accordance with embodiments of the present invention. The computer system 1 includes a processing system 2, which may include a single processor (e.g., CPU) or multiple processors (e.g., acting in parallel) 9, and may further include a memory cache, for example. The processing system 1 is in communication with physical memory (e.g., RAM) 3 and external storage 4 (such as a hard disk), such that data can be written to and read from the physical memory 3 and external storage 4.

The processing system 2 provides virtual memory 5 for use by operating system code that is executed, with the underlying storage being provided by the physical memory 3 and external storage 4. The virtual memory 5 provides a set of memory pages, a subset 5a of which are pinned pages. A page table 6 records the memory addresses for the pages in the virtual memory 5.

The processing system 2 further comprises a controller 7 which handles the reading and writing of data from and to the external storage 4, in particular in response to external interrupts generated by the processing system. Finally, the processing system 2 further includes a crash/dump handler 8.

Methods of the present invention are next described with reference to the flowcharts of FIGS. 2 to 5. FIGS. 2-5 describe computer-implemented methods of operating a computer system in an operating system test mode.

Figure 2:
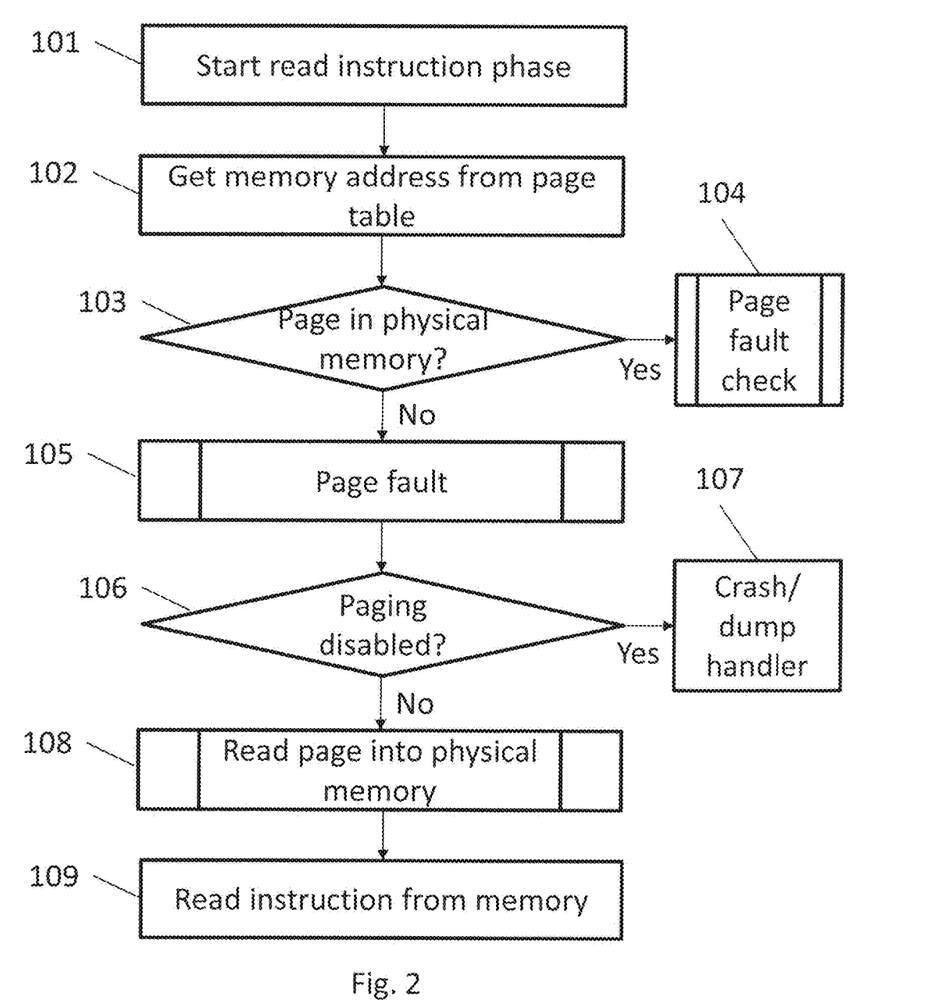
FIG. 2 is a flowchart showing a method of responding to a request for reading an instruction from virtual memory, in accordance with embodiments of the present invention.

FIG. 2 is a flowchart showing a method of responding to a request for reading an instruction from virtual memory, in accordance with embodiments of the present invention. Following the start of the instruction reading phase (step 101), the processing system 2 obtains the memory address for the page containing the instruction from the page table 6 (step 102). The processing system 2 then checks if the page is present in the physical memory 3 (step 103). If at step 103 the processing system 2 determines that the page is present in the physical memory 3, a page fault check is performed on the page (step 104), as described in more detail in FIG. 5. If at step 103 the processing system 2 determines that the page is not present in the physical memory 3, a page fault has occurred (step 105).

The processing system 2 then checks if paging is disabled (step 106), for example due to external interrupts being disabled. If at step 106 the processing system 2 determines that paging is disabled, the processing system 2 performs a crash behaviour using the crash/dump handler 8 (step 107). If at step 106 the processing system 2 determines that paging is not disabled, then the processing system 2 generates an I/O request to the controller 7, which reads the page into the physical memory 3 (step 108) from the external storage 4. The operating system code being executed by the processing system 2 is then able to read the instruction from the physical memory 3 (step 109).

Figure 3:
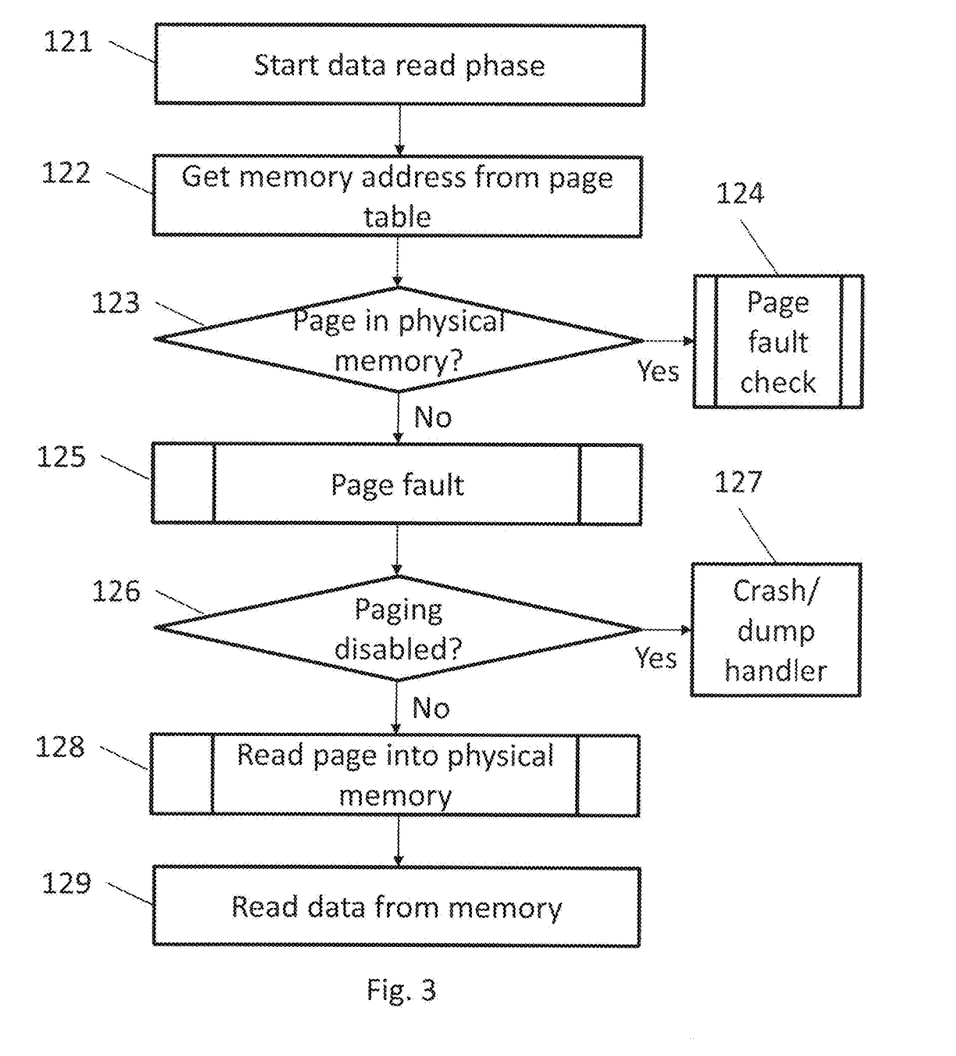
FIG. 3 is a flowchart showing a method of responding to a request for reading data from virtual memory, in accordance with embodiments of the present invention.

FIG. 3 is a flowchart showing a method of responding to a request for reading data from virtual memory, in accordance with embodiments of the present invention. The method of FIG. 3 pertaining to reading data is similar to the method of FIG. 2 pertaining to reading an instruction. Following the start of the data reading phase (step 121), the processing system 2 obtains the memory address for the page containing the data from the page table 6 (step 122). The processing system 2 then checks if the page is present in the physical memory 3 (step 123). If at step 123 the processing system 2 determines that the page is present in the physical memory 3, a page fault check on the page is performed (step 124) as described in more detail in FIG. 5. If at step 123 the processing system 2 determines that the page is not present in the physical memory 3, a page fault has occurred (step 125).

The processing system 2 then checks if paging is disabled (step 126). If at step 126 the processing system 2 determines that paging is disabled, the processing system 2 performs a crash behaviour using the crash/dump handler 8 (step 127). If at step 126 the processing system 2 determines that paging is not disabled, then the page is read into the physical memory 3 from the external storage 4 (step 128). The operating system code being executed by processing system 2 is then able to read the data from the physical memory 3 (step 129).

Figure 4:
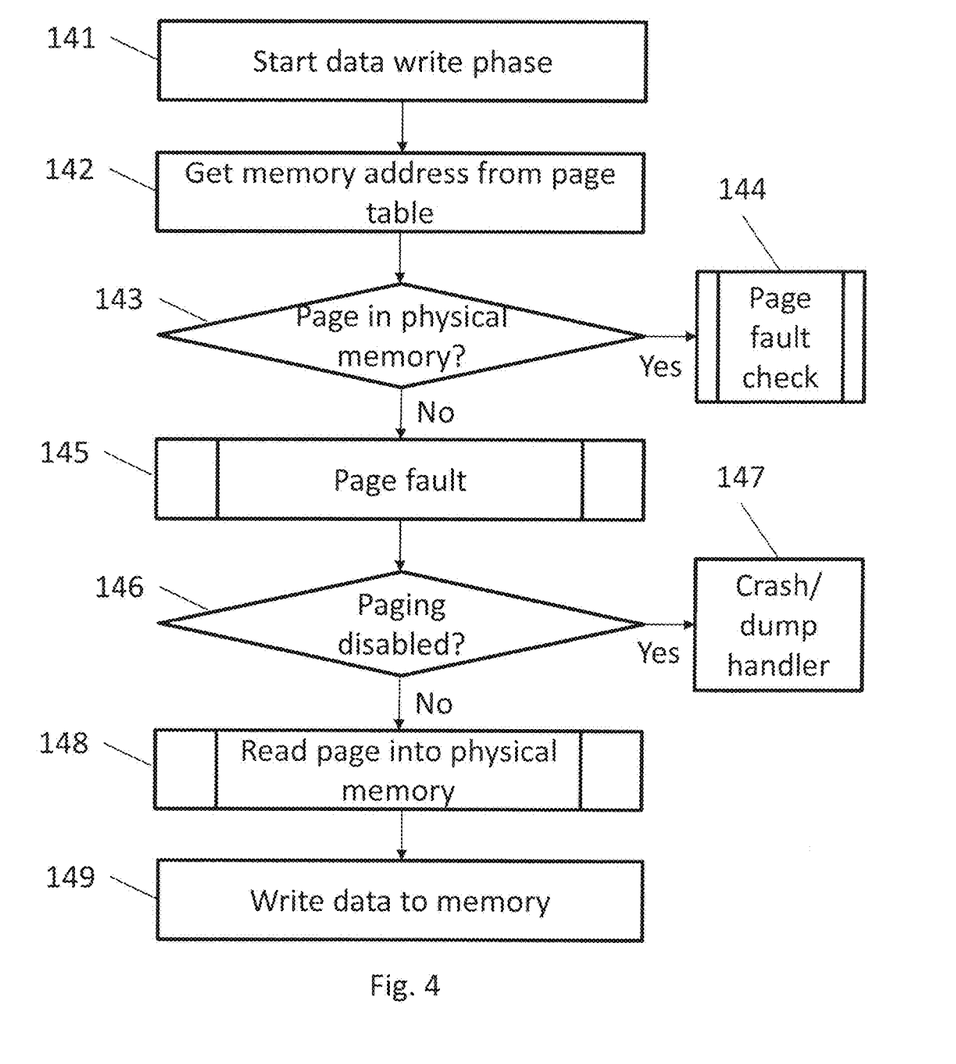
FIG. 4 is a flowchart showing a method of responding to a request for writing data to virtual memory, in accordance with embodiments of the present invention.

FIG. 4 is a flowchart showing a method of responding to a request for writing data to virtual memory, in accordance with embodiments of the present invention. The method of FIG. 4 pertaining to writing data is similar to the method of FIGS. 2 and 3 pertaining to reading an instruction and reading data, respectively. Following the start of the data writing phase (step 141), the processing system 2 obtains the memory address for the page to which the data is to be written from the page table 6 (step 142). The processing system 2 then checks if the page is present in the physical memory 3 (step 143). If step 143 determines that the page is present in the physical memory 3, a page fault check on the page is performed (step 144) as described in more detail in FIG. 5. If at step 143 the processing system 2 determines that the page is not present in the physical memory 3, a page fault has occurred (step 145).

The processing system 2 then checks if paging is disabled (step 146). If at step 146 the processing system 2 determines that paging is disabled, the processing system 2 performs a crash behaviour using the crash/dump handler 8 (step 147). If at step 146 the processing system 2 determines that paging is not disabled, then the page is read into the physical memory 3 from the external storage 4 (step 148). The operating system code being executed by processing system 2 is then able to write the data into the page in the physical memory 3 (step 149).

Figure 5:
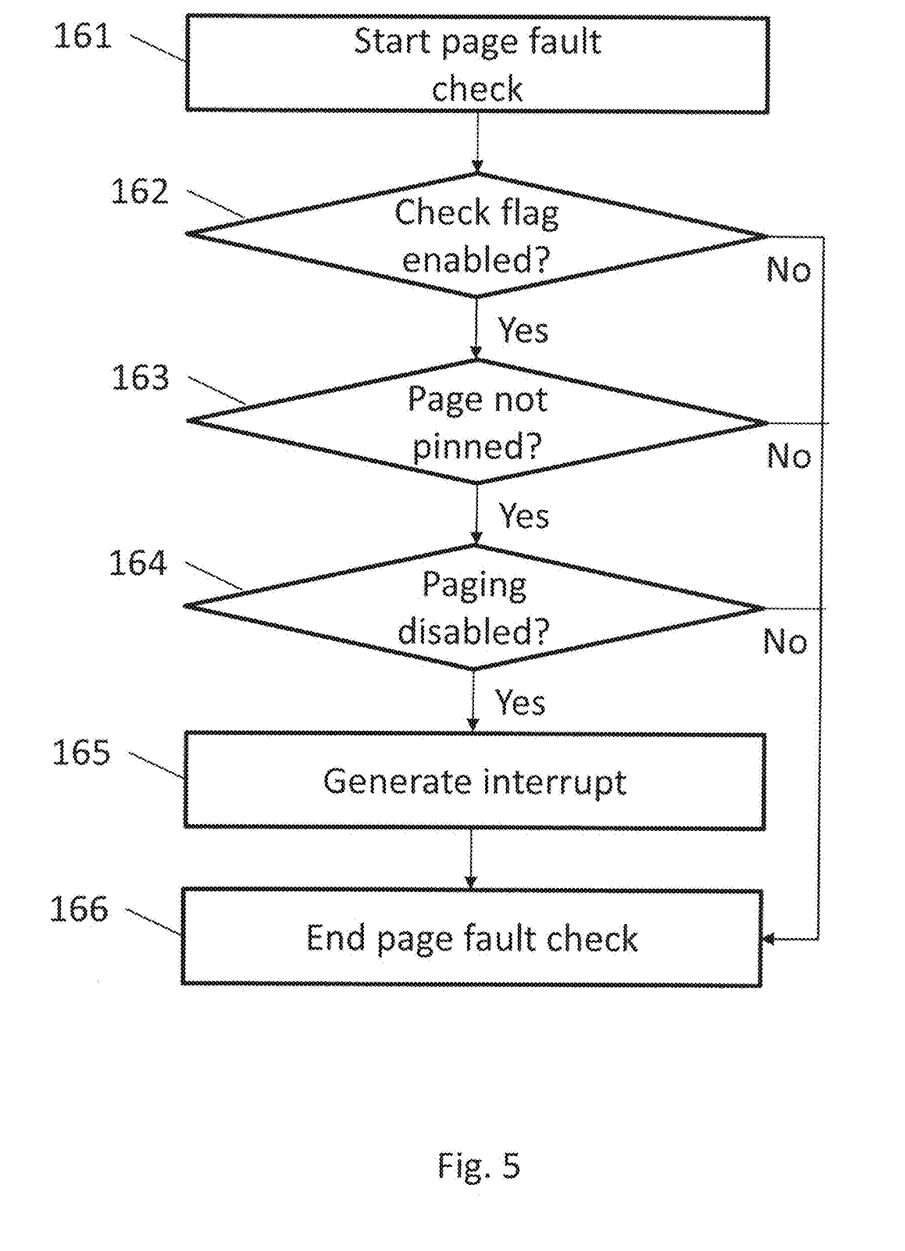
FIG. 5 is a flowchart showing a process for performing a page fault check triggered in the method of FIGS. 2 to 4, in accordance with embodiments of the present invention.

FIG. 5 is a flowchart showing a process for performing a page fault check triggered in the method of FIGS. 2 to 4, in accordance with embodiments of the present invention.

Following the start of the page fault check (step 161), the processing system 2 checks if the check flag is enabled (step 162); i.e. if the computer system 1 is being operated in the test mode. If at step 162 the processing system 2 determines that the check flag is not enabled, the page fault check ends (step 166), as testing for potential page faults is not being performed. In an alternative embodiment, the processing system 2 is arranged not to perform the page fault check at all unless the check flag is enabled.

If at step 162 the processing system 2 determines that the check flag is enabled, the processing system 2 next checks if the page is pinned in the virtual memory 5 (step 163); i.e. if the page is within the subset of pinned pages 5a. If at step 163 the processing system 2 determines that the page is pinned, the page fault check ends (step 166 again), as in this case a page fault could not occur in normal operation as it could not be the case that the page had been swapped out of the physical memory 3. In an alternative embodiment, prior to checking if the page is pinned, the processing system 2 checks again if the page is present in the physical memory 3, in case the page has been moved to the external storage 4 subsequent to the previous check. In another alternative embodiment, the three conditions are in parallel, for example by an AND gate implemented in hardware providing:

```
AND(CHECK_FLAG,
    NOT(PAGE_PINNED),
    NOT(EXTERNAL_INTERRUPTS_ENABLED)
)
```

If at step 163 the processing system 2 determines that the page is not pinned, the processing system 2 next checks if paging is disabled (step 164); i.e. if the processing system 2 is in a state in which a page fault cannot be serviced, for example because the processing system 2 has external interrupts, is disabled or is at an interrupt level that won't allow the processing system 2 to process external interrupts.

If at step 164 the processing system 2 determines that paging is not disabled, the page fault check ends (step 166), as in this case an external interrupt will be generated and serviced by the controller 7 of the processing system 2.

If at step 164 the processing system 2 determines that paging is disabled, the processing system 2 generates a test feature interrupt (step 165), and the page fault check then ends (step 166). A test feature interrupt is a page fault interrupt qualified with a "generated by this feature" flag. The "generated by this feature" flag is a flag in a status register. The "generated by this feature" serves to inform the page fault handler that the page fault was generated via a reference to an unpinned page, as opposed to more common cases of "page not present" and "page not writable".

The page fault interrupt may be a conventional data storage interrupt (DSI) indicating that an attempt to store or read data from/to an address that has no corresponding real page mapped was made, or a conventional instruction storage interrupt (ISI) indicating that an attempt to fetch an instruction from an address that has no corresponding real page mapped was made, as appropriate. In addition, a flag associated with the generated page fault interrupt in a status register of the processing system 2 is enabled, to indicate that the page fault interrupt was generated by the computer system 1 operating in the test mode rather than being the result of a conventional page fault.

In alternative embodiment, the page fault interrupt generated is an interrupt specific to the test mode of the computer system 1.

In one embodiment, in response to the page fault check generating the interrupt (step 165), the processing system 2 also pins the page in the virtual memory 5, which means that any subsequent attempts to access the page will be successful (assuming the page is not unpinned again). As a result, more testing can occur, as no page fault occurs at the subsequent attempt, which would cause the processing system 2 to perform a crash behaviour which could halt testing altogether. However, even though the pining of the memory page means a subsequent page fault will not occur and so will not be picked up, the interrupt generated for the page that is pinned already provides an indication that there is an issue that needs to be investigated, and so the testing process is not adversely affected.

In one embodiment, the system of the present invention monitors the setting of a page table entry "software" bits (the setting indicating a pinned page is operating system dependent) and generates an interrupt if an access were made through a page table entry with a specified software bit combination, which would require augmenting particular array types to retain the software bits (which otherwise the hardware would ignore). Other instructions that may need to be monitored are operating instructions such as fetch operations.

While the present invention has been described and illustrated with reference to particular embodiments, it will be appreciated by those of ordinary skill in the art that the invention lends itself to many different variations not specifically illustrated herein. For example, interrupts may be masked by flags or interrupt levels, and page faults may be separate for data and instruction (one per kind) or unified (one for all kinds). Further, it will be appreciated that various different methods of signaling to an interrupt handler the cause of the interrupt could be used in accordance with embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a computer system in an operating system test mode with respect to memory address pinning in virtual memory, the computer system comprising: a processor system comprising one or more processors; a physical memory system comprising one or more memories; and a secondary storage memory system comprising one or more computer readable hardware storage devices, wherein the processor system uses the physical memory system and secondary storage memory to provide the virtual memory, said method comprising, in response to a request to access a memory address in the virtual memory:
    said one or more processors determining that a memory page associated with the memory address is available in the physical memory system, a first flag is set to an indication that the processor system is being operated in the operating system test mode, the memory page associated with the memory address is not pinned in the virtual memory, and a second flag is set to an indication that paging is disabled, and in response, said one or more processors generating an interrupt, wherein the interrupt generated indicates that the interrupt was generated in accordance with the operating system test mode; and
    in response to said generating the interrupt, said one or more processors pinning the memory page in the virtual memory, which: prevents occurrence of a page fault in response to a subsequent attempt to access the memory page; and prevents disruption of further testing since an operating system in the computer system is configured to perform crash behaviour in response to the occurrence of the page fault.

2. A computer system, comprising:
a processor system comprising one or more processors;
a physical memory system comprising one or more memories; and
a secondary storage memory system comprising one or more computer readable hardware storage devices, wherein the processor system uses the physical memory system and secondary storage memory to provide virtual memory, wherein the one or more hardware storage devices contain program code executable by the one or more processors via the one or more memories to implement a method in which the computer system operates in an operating system test mode with respect to memory address pinning in the virtual memory, said method comprising:
    said one or more processors determining that a memory page associated with the memory address is available in the physical memory system, a first flag is set to an indication that the processor system is being operated in the operating system test mode, the memory page associated with the memory address is not pinned in the virtual memory, and a second flag is set to an indication that paging is disabled, and in response, said one or more processors generating an interrupt, wherein the interrupt generated indicates that the interrupt was generated in accordance with the operating system test mode; and
    in response to said generating the interrupt, said one or more processors pinning the memory page in the virtual memory, which: prevents occurrence of a page fault in response to a subsequent attempt to access the memory page; and prevents disruption of further testing since an operating system in the computer system is configured to perform crash behaviour in response to the occurrence of the page fault.

3. A computer program product, comprising one or more computer readable hardware storage devices having computer readable program code stored therein, said program code containing instructions executable by one or more processors of a computer system to implement a method for operating the computer system in an operating system test mode with respect to memory address pinning in virtual memory, the computer system comprising: a processor system comprising the one or more processors; a physical memory system; and a secondary storage memory system comprising the one or more computer readable hardware storage devices, wherein the processor system uses the physical memory system and secondary storage memory to provide virtual memory, said method comprising: in response to a request to access a memory address in the virtual memory:

said one or more processors determining that a memory page associated with the memory address is available in the physical memory system, a first flag is set to an indication that the processor system is being operated in the operating system test mode, the memory page associated with the memory address is not pinned in the virtual memory, and a second flag is set to an indication that paging is disabled, and in response, said one or more processors generating an interrupt, wherein the interrupt generated indicates that the interrupt was generated in accordance with the operating system test mode; and     in response to said generating the interrupt, said one or more processors pinning the memory page in the virtual memory, which: prevents occurrence of a page fault in response to a subsequent attempt to access the memory page; and prevents disruption of further testing since an operating system in the computer system is configured to perform crash behaviour in response to the occurrence of the page fault.

\* \* \* \* \*